(12) United States Patent
Nishimine et al.

(10) Patent No.: US 8,868,277 B2
(45) Date of Patent: Oct. 21, 2014

(54) VEHICULAR HYBRID DRIVE SYSTEM

(75) Inventors: Akiko Nishimine, Toyota (JP); Koji Hayashi, Aichi-gun (JP); Takeshi Kanayama, Toyota (JP); Tetsuo Hori, Toyota (JP); Tomoyuki Maruyama, Tajimi (JP); Takeshi Miyagawa, Toyokawa (JP); Ryoki Ii, Toyota (JP); Tomoaki Furukawa, Toyota (JP); Norihiro Yamamura, Miyoshi (JP); Akihiro Sato, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 45 days.

(21) Appl. No.: 13/882,892

(22) PCT Filed: Nov. 4, 2010

(86) PCT No.: PCT/JP2010/069586
§ 371 (c)(1),
(2), (4) Date: May 1, 2013

(87) PCT Pub. No.: WO2012/059998
PCT Pub. Date: May 10, 2012

(65) Prior Publication Data
US 2013/0253744 A1    Sep. 26, 2013

(51) Int. Cl.
*B60L 9/00* (2006.01)
*B60W 10/30* (2006.01)
*B60K 6/445* (2007.10)
*B60W 20/00* (2006.01)
*B60W 10/08* (2006.01)
*B60W 30/184* (2012.01)

(52) U.S. Cl.
CPC ......... *B60W 20/20* (2013.01); *B60W 2510/087* (2013.01); *B60W 10/30* (2013.01); *Y10S 903/93* (2013.01); *B60K 6/445* (2013.01); *Y02T 10/6239* (2013.01); *B60W 10/08* (2013.01); *B60W 30/1843* (2013.01); *B60W 20/00* (2013.01); *B60W 2600/00* (2013.01)
USPC ................... 701/22; 180/65.265; 180/65.285; 903/930

(58) Field of Classification Search
CPC ..... B60W 20/00; B60W 20/20; B60W 10/30; B60W 30/1843; B60W 2510/087
USPC ........................... 701/22; 180/65.265, 65.285
See application file for complete search history.

(56) References Cited

FOREIGN PATENT DOCUMENTS

| JP | A-2000-27672 | 1/2000 |
|---|---|---|
| JP | A-2009-292319 | 12/2009 |
| JP | A-2010-143398 | 7/2010 |

OTHER PUBLICATIONS

Translation of Japanese Laid-Open Patent Publication No. 2010-143398.

*Primary Examiner* — Thomas Tarcza
*Assistant Examiner* — Kevin Myhre
(74) *Attorney, Agent, or Firm* — Oliff PLC

(57) ABSTRACT

A hybrid drive system configured to selectively establish one of a first drive mode in which a first motor/generator MG1 is operated with a drive force of an engine, to generate an electric energy and in which a vehicle drive force is generated primarily by a second motor/generator MG2, and a second drive mode in which the vehicle drive force is generated by the engine, and at least one of the first motor/generator MG1 and second motor/generator MG2 is operated to generate an assisting vehicle drive force, as needed, and further configured such that an amount of a working oil to be supplied to the first motor/generator MG1 is larger in the first drive mode than in the second drive mode, permitting sufficient cooling of the electric motor depending upon a selected one of the vehicle drive modes.

7 Claims, 10 Drawing Sheets

FIG.6

| DRIVE MODE | | ENGINE 12 | MG1 | MG2 | STARTING CLUTCH 26 |
|---|---|---|---|---|---|
| EV | | REST STATE | FREE STATE | VEHICLE DRIVING STATE | POWER CUT-OFF STATE |
| SERIES HEV | | OPERATED STATE | ELECTRICITY GENERATING STATE | VEHICLE DRIVING STATE | POWER CUT-OFF STATE |
| PARALLEL HEV | a | OPERATED STATE | VEHICLE DRIVING STATE | FREE STATE | POWER TRANSMITTING STATE |
| | b | OPERATED STATE | ELECTRICITY GENERATING STATE | VEHICLE DRIVING STATE | POWER TRANSMITTING STATE |
| | c | OPERATED STATE | FREE STATE | FREE STATE | POWER TRANSMITTING STATE |
| | d | OPERATED STATE | VEHICLE DRIVING STATE | VEHICLE DRIVING STATE | POWER TRANSMITTING STATE |
| DECELERATING RUN | | REST STATE | FREE STATE | ELECTRICITY GENERATING STATE | POWER CUT-OFF STATE |

FIG.7

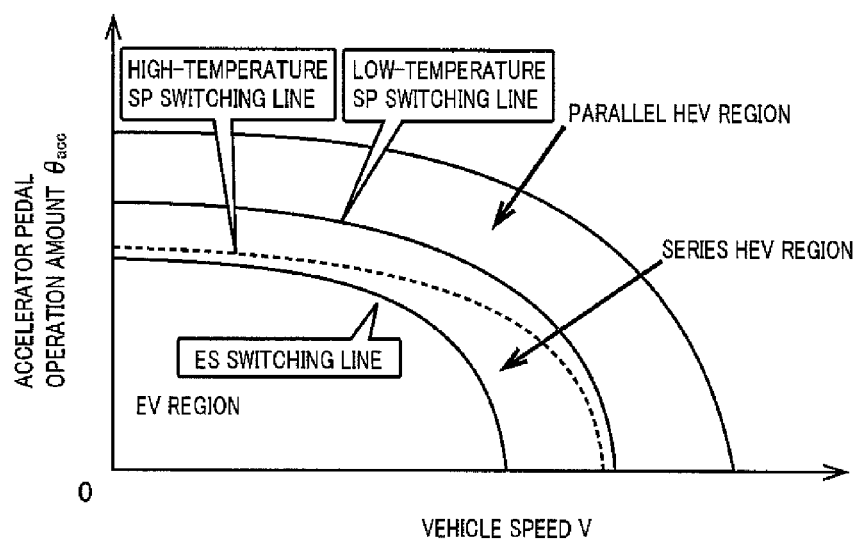

FIG.8

| | MG1 FUNCTION | MG1 GENERATED HEAT | EOP ON TIMING | | | EOP OFF TIMING | | | | CONTINUOUS OPERATION TIME OF EOP | EOP SPEED (DELIVERY AMOUNT) |
|---|---|---|---|---|---|---|---|---|---|---|---|
| | | | MG1 TEMPERATURE | VEHICLE SPEED | ENGINE SPEED | MG1 TEMPERATURE | VEHICLE SPEED | ENGINE SPEED | EOP TEMPERATURE | | |
| SERIES HEV | REGENERATION | LARGE | LOW | LOW | LOW | HIGH | HIGH | HIGH | HIGH | LONG | HIGH (LARGE) |
| PARALLEL HEV | VEHICLE DRIVING | SMALL | HIGH | HIGH | HIGH | LOW | LOW | LOW | LOW | SHORT | LOW (SMALL) |

FIG.10
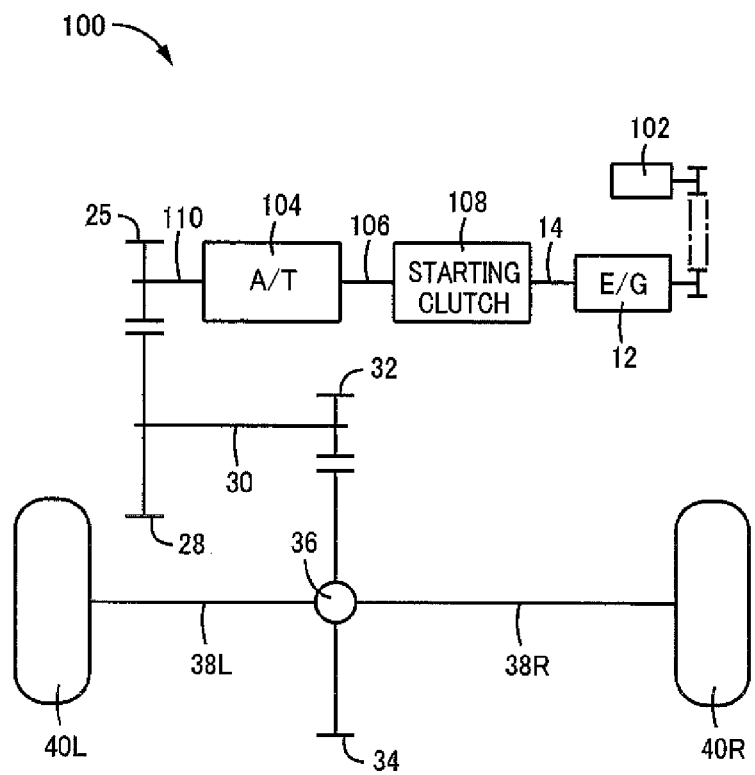
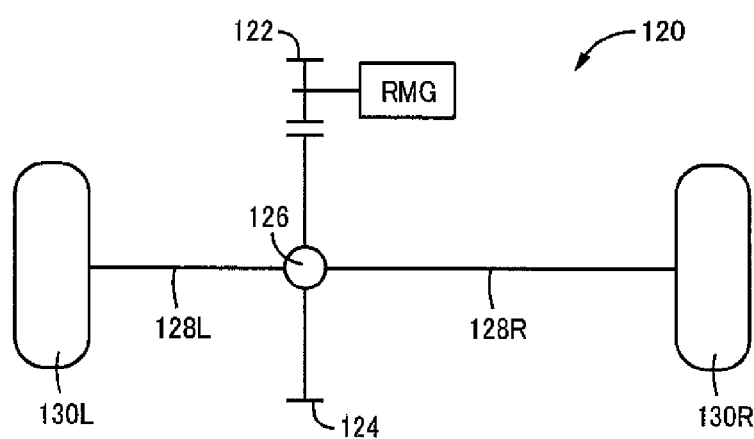

FIG.11(a)

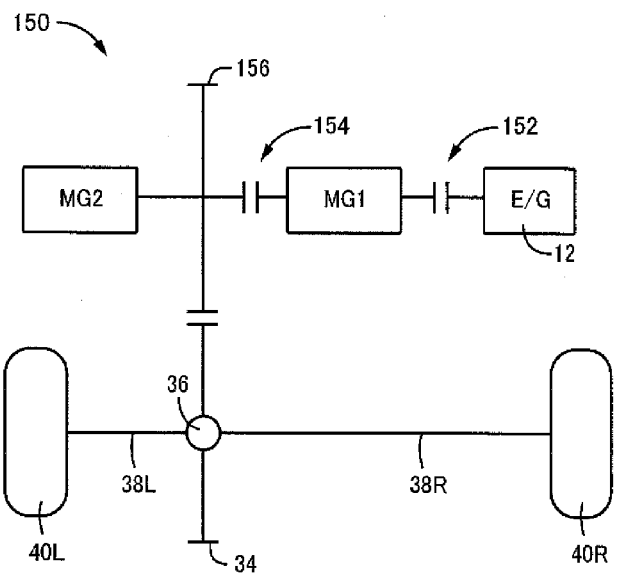

FIG.11(b)

| DRIVE MODE | | ENGINE 12 | MG1 | MG2 | FIRST CLUTCH 152 | SECOND CLUTCH 154 |
|---|---|---|---|---|---|---|
| EV | | REST STATE | FREE STATE | VEHICLE DRIVING STATE | POWER CUT-OFF STATE | POWER CUT-OFF STATE |
| SERIES HEV | | OPERATED STATE | ELECTRICITY GENERATING STATE | VEHICLE DRIVING STATE | POWER TRANSMITTING STATE | POWER CUT-OFF STATE |
| PARALLEL HEV | a | OPERATED STATE | VEHICLE DRIVING STATE | FREE STATE | POWER TRANSMITTING STATE | POWER TRANSMITTING STATE |
| | b | OPERATED STATE | ELECTRICITY GENERATING STATE | VEHICLE DRIVING STATE | POWER TRANSMITTING STATE | POWER TRANSMITTING STATE |
| | c | OPERATED STATE | FREE STATE | FREE STATE | POWER TRANSMITTING STATE | POWER TRANSMITTING STATE |
| | d | OPERATED STATE | VEHICLE DRIVING STATE | VEHICLE DRIVING STATE | POWER TRANSMITTING STATE | POWER TRANSMITTING STATE |
| DECELERATING RUN | | REST STATE | FREE STATE | ELECTRICITY GENERATING STATE | POWER CUT-OFF STATE | POWER CUT-OFF STATE |

FIG.12(b)

| DRIVE MODE | | ENGINE 12 | MG1 | MG2 | FIRST CLUTCH 166 | SECOND CLUTCH 168 | BRAKE 170 |
|---|---|---|---|---|---|---|---|
| EV | | REST STATE | FREE STATE | VEHICLE DRIVING STATE | POWER CUT-OFF STATE | POWER CUT-OFF STATE | ENGAGED |
| SERIES HEV | | OPERATED STATE | ELECTRICITY GENERATING STATE | VEHICLE DRIVING STATE | POWER TRANSMITTING STATE | POWER CUT-OFF STATE | ENGAGED |
| PARALLEL HEV | a | OPERATED STATE | FREE STATE | VEHICLE DRIVING STATE | POWER TRANSMITTING STATE | POWER TRANSMITTING STATE | RELEASED |
| | b | OPERATED STATE | ELECTRICITY GENERATING STATE | VEHICLE DRIVING STATE | POWER TRANSMITTING STATE | POWER TRANSMITTING STATE | RELEASED |
| | c | OPERATED STATE | VEHICLE DRIVING STATE | VEHICLE DRIVING STATE | POWER TRANSMITTING STATE | POWER TRANSMITTING STATE | RELEASED |
| DECELERATING RUN | | REST STATE | FREE STATE | ELECTRICITY GENERATING STATE | POWER CUT-OFF STATE | POWER CUT-OFF STATE | ENGAGED |

VEHICULAR HYBRID DRIVE SYSTEM

TECHNICAL FIELD

The present invention relates to a vehicular hybrid drive system, and more particularly to an improvement of the hybrid drive system, which permits sufficient cooling of an electric motor depending upon a selected one of vehicle drive modes.

BACKGROUND ART

There is known a vehicular hybrid drive system provided with an engine, a first electric motor connected to the engine, and a second electric motor connected to drive wheels. There has been proposed a technique to suitably cooling an electric motor depending upon a selected drive mode of such a vehicular hybrid drive system. Patent Document 1 discloses an example of a cooling device for practicing the technique. This cooling device is configured to control a delivery amount of an oil pump such that an amount of a working oil to be supplied to the electric motor is larger in a drive mode of the hybrid drive system in which a vehicle drive force generated according to a selected output characteristic at an operation amount of an accelerator pedal is larger than in a drive mode in which the vehicle drive force according to selected another output characteristic is comparatively small, so that the amount of the working oil to be supplied to the electric motor for cooling the electric motor can be increased with an increase of the required vehicle drive force, making it possible to sufficiently cool the electric motor depending upon the selected drive mode of the hybrid drive system.

PRIOR ART DOCUMENT

Patent Document

Patent Document 1: JP-A-2009-292319

SUMMARY OF THE INVENTION

Object Achieved by the Invention

By the way, one type of such a known vehicular hybrid drive system as described above is arranged to selectively establish a first drive mode in which the above-described first electric motor is operated with a drive force of the above-described engine, to generate an electric energy and in which a vehicle drive force is generated primarily by the above-described second electric motor, and a second drive mode in which the vehicle drive force is generated by the above-described engine, and at least one of the above-described first and second electric motors is operated to generate an assisting vehicle drive force, as needed. In this type of the vehicular hybrid drive system, a hybrid drive control is implemented to determine one of regions for establishing a corresponding one of the first and second drive modes, on the basis of the presently detected vehicle speed and accelerator pedal operation amount, and according to a predetermined relationship (drive mode switching map), and to establish the determined drive mode. According to the above-indicated relationship for establishing one of the drive modes, the region of the running state corresponding to the above-described second drive mode is generally located on the side of a higher vehicle speed and a large vehicle drive force (a larger accelerator pedal operation amount), with respect to the region corresponding to the above-described first drive mode. Namely, the above-described second drive mode is generally established when a comparatively large vehicle driver force is required.

The present inventors made a continuous intensive research in an effort to further improve the performance of the vehicular hybrid drive system, and the research revealed an unknown problem relating to the cooling of the electric motor in the vehicular hybrid drive vehicle, which has been described above. That is, when the operating conditions of the above-described first electric motor in the above-described first and second drive modes are compared with each other, it is noted that the first electric motor is operated in the above-described second drive mode to generate the assisting vehicle drive force, as needed, while the first electric motor is kept operated in the above-described first drive mode to generate an electric energy (to perform a regenerative operation). Accordingly, the need for cooling the above-described first electric motor is higher in the first drive mode than in the second drive mode. According to the prior art technique described above, however, the amount of the working oil to be supplied to the electric motor for cooling the electric motor is increased with an increase of the required vehicle drive force, so that the amount of the working oil to be supplied to the above-described first and second electric motors for cooling these electric motors is larger in the second drive mode in which the required vehicle drive force is comparatively large, than in the first drive mode in which the required vehicle drive force is comparatively small. As a result, the amount of the working oil used for cooling the electric motors is excessively large in the above-described second drive mode, leading to deterioration of the fuel economy, and a risk of insufficient cooling of the above-described first electric motor in the above-described first drive mode.

The present invention was made in view of the background art described above. It is therefore an object of the present invention to provide a vehicular hybrid drive system, which permits sufficient cooling of an electric motor depending upon a selected one of vehicle drive modes.

Means for Achieving the Object

The object indicated above is achieved according to the present invention, which provides a vehicular hybrid drive system provided with an engine, a first electric motor connected to the engine, and a second electric motor connected to drive wheels of the vehicle, the hybrid drive system being configured to selectively establish one of a first drive mode in which the above-described first electric motor is operated with a drive force of the above-described engine, to generate an electric energy and in which a vehicle drive force is generated primarily by the above-described second electric motor, and a second drive mode in which the vehicle drive force is generated by the above-described engine and in which at least one of the above-described first and second electric motors is operated to generate an assisting vehicle drive force, as needed, the hybrid drive system being characterized in that an amount of a working oil to be supplied to the above-described first electric motor in the above-described first drive mode is larger than that generated in the above-described second drive state.

Advantages of the Invention

In the hybrid drive system constructed according to the present invention, the amount of the working oil to be supplied to the above-described first electric motor is larger in the above-described first drive mode than in the above-described second drive mode, so that the above-described first electric motor is sufficiently cooled in the above-described first drive mode in which the need for cooling the first electric motor is relatively high, while the amount of the working oil to be supplied to the first electric motor is restricted in the above-described second drive mode, whereby the fuel economy of the vehicle can be improved, and a dragging power loss due to an excessive amount of supply of the working oil can be reduced. Namely, the present invention provides the vehicular hybrid drive system which permits sufficient cooling of the electric motor depending upon a selected one of the vehicle drive modes.

In a preferred form of this invention, the vehicular hybrid drive system is provided with a temperature sensor for detecting a temperature of the above-described first electric motor, and is configured to determine one of regions for establishing a corresponding one of the above-described first and second drive modes, on the basis of a running speed of the vehicle speed and a value relating to a required vehicle drive force, and according to a relationship which is predetermined so as to enlarge the region for establishing the above-described second drive mode, with an increase of the temperature of the above-described first electric motor detected by the above-described temperature sensor. In this preferred form of the invention, the region for establishing the above-described second drive mode in which a need for cooling the above-described first electric motor is relatively low is enlarged with an increase of the need for cooling the first electric motor as a result of a rise of its temperature, so that the amount of the working oil to be supplied to the above-described first electric motor can be restricted, and the fuel economy can be further improved.

In another preferred form of the invention, the vehicular hybrid drive system is provided with an electric oil pump for supplying the working oil to the above-described first electric motor, and is configured to control a delivery amount of the electric oil pump, for thereby controlling the amount of the working oil to be supplied to the above-described first electric motor. In this preferred form of the invention, the amount of the working oil to be supplied to the above-described first electric motor for cooling the first electric motor can be controlled in a practically advantageous manner.

In a further preferred form of the invention, the vehicular hybrid drive system is provided with a hydraulic circuit for controlling the amount of the working oil to be supplied to the above-described first electric motor, and is configured to control an electromagnetic control valve provided in the hydraulic circuit, for thereby controlling the amount of the working oil to be supplied to the above-described first electric motor. In this preferred form of the invention, the amount of the working oil to be supplied to the above-described first electric motor for cooling the first electric motor can be controlled in a practically advantageous manner.

In a still further preferred form of the invention, an output torque of the above-described second electric motor is larger than that of the above-described first electric motor when the above-described first and second electric motors are operated to generate the assisting vehicle drive force in the above-described second drive mode. In this preferred form of the invention, the above-described second electric motor which is designed to be sufficiently cooled is assigned to generate the larger assisting vehicle drive force, for thereby reducing the amount of the working oil to be supplied to the above-described first electric motor, and further improving the fuel economy.

BRIEF DESCRIPTION OF THE DRAWINGS

FIG. 6 is a view for explaining a plurality of drive modes to be selectively established in the vehicular hybrid drive system of FIG. 1;

FIG. 7 is a view showing one example of a relationship used to determine one of the drive modes of FIG. 6, in the vehicular hybrid drive system of FIG. 1;

FIG. 8 is a view for explaining detected values of various sensors, operating states of various devices, and a control of an amount of an oil to be supplied from an electric oil pump to a first motor/generator, in each of a "series HEV" drive mode and a "parallel HEV" drive mode indicated in FIG. 6;

FIG. 10 is a schematic view showing an arrangement of another vehicular hybrid drive system to which the present invention is suitably applicable;

FIG. 11 are views for explaining a further vehicular hybrid drive system to which the present invention is suitably applicable, FIG. 11(a) being a schematic view showing an arrangement of the vehicular hybrid drive system, while FIG. 11(b) being a view for explaining a plurality of drive states to be selectively established in the vehicular hybrid drive system.

MODE FOR CARRYING OUT THE INVENTION

Preferred embodiments of the present invention will be described in detail by reference to the drawings.

First Embodiment

Figure 1:
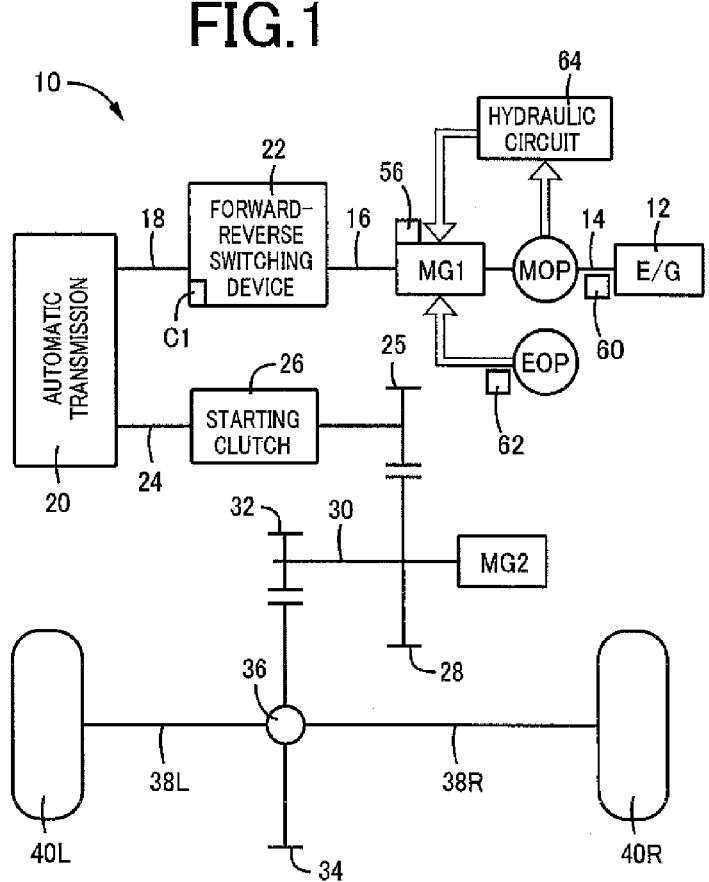
FIG. 1 is a schematic view shown an arrangement of a vehicular hybrid drive system to which the present invention is suitably applicable.

FIG. 1 is the schematic view shown the arrangement of a vehicular hybrid drive system 10 to which the present invention is suitably applicable. As shown in FIG. 1, the hybrid vehicle according to the present invention is provided with: an engine 12; a first motor/generator MG1 connected to a crankshaft 14 of the engine 12; a forward-reverse switching device 22 connected to the first motor/generator MG1 through an intermediate shaft 16 and to an automatic transmission 20 through an input shaft 18; a starting clutch 26 interposed between an output shaft 24 of the automatic transmission 20 and a first gear 25 and configured to selectively place a power transmitting path therebetween in a power transmitting state and a power cut-off state; a counter shaft 30 on which a second gear 28 meshing with the first gear 25 is mounted; a second motor/generator MG2 connected to the counter shaft 30; a third gear 32 mounted on the counter shaft 30; a differential gear device 36 provided with a fourth gear 34 meshing with the third gear 32; and left and right front drive wheels 40L and 40R connected to the differential gear device 36 through respective left and right axles 38L and 38R. The engine 12 is an internal combustion engine constructed to generate a drive force by combustion of a fuel, while the first motor/generator MG1 and the second motor/generator MG2 can be used as electric motors and electric generators. In the present embodiment, the first motor/generator MG1 functions as a first electric motor operatively connected directly or indirectly to the crankshaft 14 of the above-indicated engine 12, while the second motor/generator MG2 functions as a second electric motor operatively connected directly or indirectly to the above-indicated left and right front drive wheels 40L, 40R.

Figure 2:
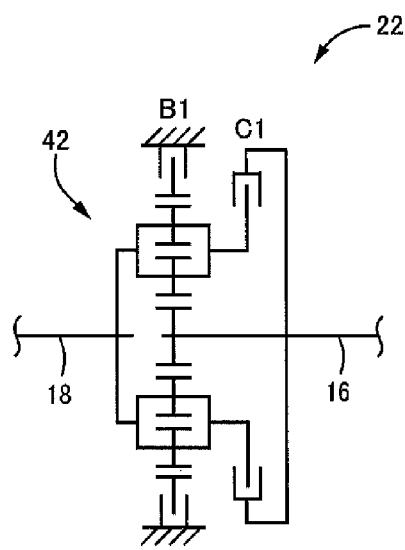
FIG. 2 is a schematic view for explaining an arrangement of a forward-reverse switching device provided in the vehicular hybrid drive system of FIG. 1.

As shown in FIG. 2, the above-indicated forward-reverse switching device 22 is provided with a planetary gear set 42 of a double-pinion type, a forward clutch C1 and a reverse drive brake B1, for example. Described more specifically, the planetary gear set 42 has a sun gear connected to the intermediate shaft 16, a carrier connected to the input shaft 18 and selectively connected to the intermediate shaft 16 through the forward drive clutch C1, and a ring gear selectively brought into a locked state through the reverse drive brake B1. When the forward drive clutch C1 and the reverse drive brake B1 are both placed in their released state, a power transmitting path between the intermediate shaft 16 and the input shaft 18 is placed in a power cut-off state. When the forward drive clutch C1 is placed in its engaged state while the reverse drive brake B1 is placed in its released state, the forward-reverse switching device 22 is placed in a forward driving state in which a rotary motion of the intermediate shaft 16 is transmitted to the input shaft 18, without reversal of the direction of rotation. When the forward drive clutch C1 is placed in its released state while the reverse drive brake B1 is placed in its engaged state, the forward-reverse switching device 22 is placed in a reverse driving state in which the rotary motion of the intermediate shaft 16 is transmitted to the input shaft 18 such that the direction of rotation of the input shaft 18 is reversed with respect to that of the intermediate shaft 16. For instance, the forward drive clutch C1 and the reverse drive brake B1 are constituted by hydraulically operated frictional coupling devices. It is noted that the forward-reverse switching device 22 may be otherwise constructed, for example, may be provided with a planetary gear set of a single-pinion type.

The automatic transmission 20 according to the present embodiment is a belt-type continuously-variable transmission provided with an input pulley and an output pulley. The input pulley is disposed coaxially with the above-described engine 12, first motor/generator MG1 and forward-reverse switching device 22, while the output pulley is disposed coaxially with the above-described starting clutch 26 and first gear 25. The above-described starting clutch 26 is a hydraulically operated frictional coupling device, and functions as a connecting/disconnecting device interposed between the output shaft 24 and the first gear 25 and configured to be switched between a power transmitting state and a power cut-off state. It is noted that the forward-reverse switching device 22 may be modified so as to have a neutral state, namely, a power cut-off state, so that the forward-reverse switching device 22 is also operable as the above-indicated connecting/disconnecting device.

The above-described vehicular hybrid drive system 10 is provided with an electric oil pump EOP for supplying a working oil to the above-described first motor/generator MG1, to cool the first motor/generator MG1. This electric oil pump EOP has an electric motor, and a pumping mechanism driven by the electric motor, which is operated with an electric power (electric energy) supplied from an electric-energy storage device not shown, so that the electric oil pump EOP sucks the working oil and pressurize the sucked working oil to a predetermined hydraulic pressure. The pressurized working oil delivered from the electric oil pump EOP is supplied to the above-described first motor/generator MG1 directly or through a hydraulic circuit not shown, for cooling the first motor/generator MG1. Namely, the pressurized working oil delivered from the above-described electric oil pump EOP is supplied (sprayed or injected) to a stator core and other components of the first motor/generator MG1, so that the first motor/generator MG1 is cooled by the pressurized working oil.

The above-described vehicular hybrid drive system 10 is further provided with a mechanical oil pump MOP and a hydraulic circuit 64 for supplying the working oil to the above-described first motor/generator MG1, to cool the first motor/generator MG1. This mechanical oil pump MOP has a pumping mechanism operatively connected to the crankshaft 14 of the above-described engine 12 and operated by the engine 12, so that the mechanical oil pump MOP operated by a rotary motion of the crankshaft 14 sucks the working oil and pressurize the sucked working oil to a predetermined line pressure. This line pressure generated by the mechanical oil pump MOP is regulated by the above-indicated hydraulic circuit 64 before the working oil is supplied to the above-described first motor/generator MG1 to cool the first motor/generator MG1. Namely, the pressurized working oil which is delivered from the above-described mechanical oil pump MOP and the pressure of which is regulated by the hydraulic circuit 64 is supplied (sprayed or injected) to the stator core and other components of the first motor/generator MG1, so that the first motor/generator MG1 is cooled by the pressurized working oil. The working oil pressurized by the above-described mechanical oil pump MOP to the predetermined line pressure is also used for shifting the above-described automatic transmission 20. For supplying the working oil to the above-described first motor/generator MG1 to cool the first motor/generator MG1, at least one of (a) the electric oil pump EOP and (b) a set of the mechanical oil pump MOP and the hydraulic circuit 64 is required, that is, both of them are not necessarily required.

Figure 3:
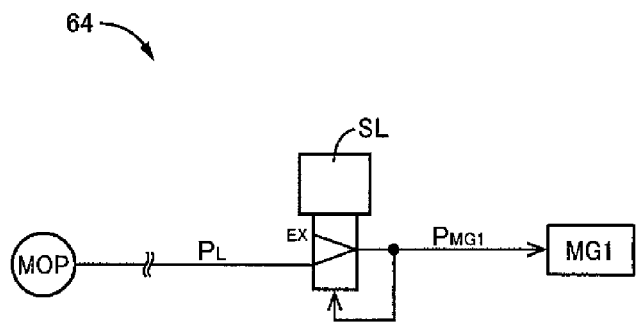
FIG. 3 is a view showing an example of a hydraulic circuit provided in the vehicular hybrid drive system of FIG. 1.

FIG. 3 is the view showing one example of the above-indicated hydraulic circuit 64. As shown in FIG. 3, the above-indicated hydraulic circuit 64 is provided with a linear solenoid valve SL for regulating the hydraulic pressure of the working oil to a pressure value $P_{MG1}$ which corresponds to an amount of the working oil to be supplied to the above-described first motor/generator MG1. This linear solenoid valve SL has a solenoid coil an electromagnetic force of which is controlled according to a command signal received from an electronic control device 50 described below, for switching the states of communication between an input port and an output port or a drain port, to regulate the line pressure $P_L$ of the working oil delivered from the above-described mechanical oil pump MOP, to the above-indicated hydraulic pressure $P_{MG1}$ according to the above-indicated command signal, so that the working oil having the hydraulic pressure $P_{MG1}$ is supplied to the above-described first motor/generator MG1. The working oil of the thus generated hydraulic pressure $P_{MG1}$ is dripped (sprayed or injected) onto the stator core and other components of the first motor/generator MG1 to cool the first motor/generator MG1.

Figure 4:
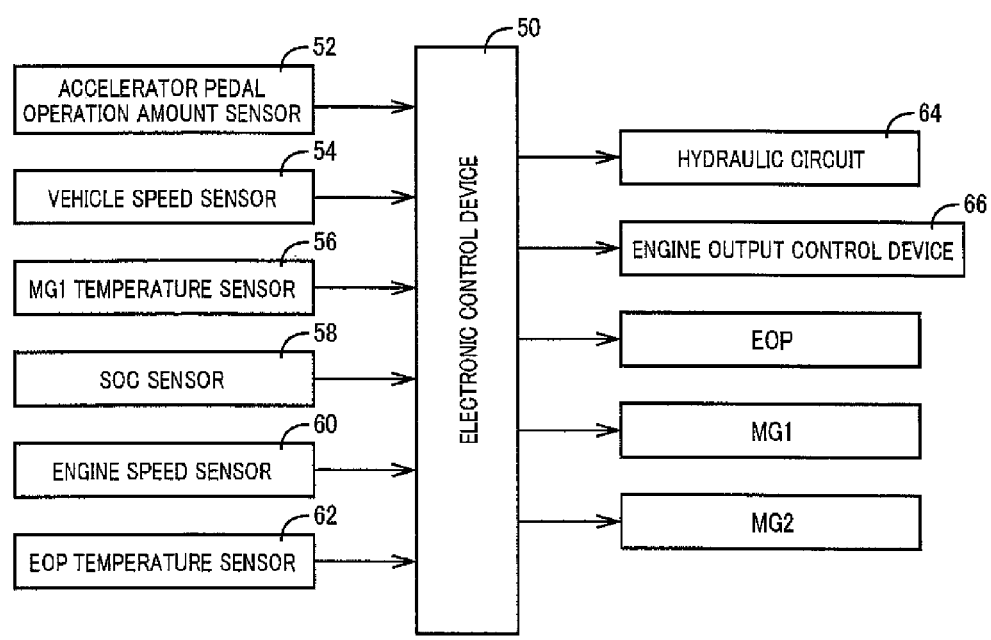
FIG. 4 is a view for explaining an electronic control device and various components of an electric system provided for the vehicular hybrid drive system of FIG. 1.

The vehicular hybrid drive system 10 constructed as described above is provided with the electronic control device 50 configured to implement a hybrid control for running the hybrid vehicle 10 in a selected one of a plurality of drive modes with a selected one of combinations of the drive power sources, and a shifting control of the above-described automatic transmission 20. FIG. 4 is the view for explaining the electronic control device 50. This electronic control device 50 includes a microcomputer configured to perform signal processing operations according to programs stored in a ROM while utilizing a temporary data storage function of a RAM. The electronic control device 50 receives an output signal of an accelerator pedal operation amount sensor 52 indicative of an operation amount θacc of an accelerator pedal, an output signal of a vehicle speed sensor 54 indicative of a vehicle running speed V, an output signal of an MG1 temperature sensor indicative of a temperature $T_{MG1}$ of the above-described first motor/generator MG1, an output signal of an SOC sensor 58 indicative of an electric energy amount SOC stored in an electric-energy storage device (battery) which is an electric power source for the first motor/generator MG1 and second motor/generator MG2, an engine speed sensor 60 indicative of an operating speed $N_E$ of the above-described engine 12, and an EOP temperature sensor 62 indicative of a temperature $T_{EOP}$ of the above-described electric oil pump EOP. The above-indicated MG1 temperature sensor 56 preferably detects the temperature of the working oil supplied to the above-described first motor/generator MG1. However, the MG1 temperature sensor 56 may directly detect the temperature of a stator of the first motor/generator MG1, for instance. Alternatively, the MG1 temperature sensor 56 may detects the temperature of the working oil which has been discharged after cooling the first motor/generator MG1. The above-indicated EOP temperature sensor 62 preferably detects the temperature of the working oil delivered from the above-described electric oil pump EOP. However, the EOP temperature sensor 62 may directly detect the temperature of a pumping mechanism of the electric oil pump EOP, for instance. The electronic control device 50 receives various other kinds of information such as operating speeds of the above-described motor/generator MG1 and second motor/generator MG2 which are detected by respective speed sensors.

The above-described electronic control device 50 generates control commands to be applied to various portions of the above-described vehicular hybrid drive system 10. Namely, the vehicular hybrid drive system 10 is provided with an engine output control device 66 configured to control an output of the above-described engine 12, by implementing a fuel supply control for controlling a fuel injecting device to inject a fuel into an intake pipe, an ignition control for controlling an igniting device to control the ignition timing of the engine 12, and a throttle opening control for controlling an angle of opening of an electronic throttle valve. The above-described electronic control device 50 applies to the above-described engine output control device 66, engine output control commands for controlling the output of the engine 12, such as a fuel injection amount signal for controlling the amount of injection of the fuel, an ignition signal for controlling the ignition timing, and an electronic throttle valve drive signal for controlling the angle of opening $θ_{TH}$ of the electronic throttle valve. The above-described hybrid vehicle 10 is also configured to apply a command signal to the linear solenoid valve SL provided in the hydraulic circuit 64, for regulating the pressure $P_{MG1}$ of the working oil supplied to the above-describe first motor/generator MG1, and to apply a command signal to the above-described electric oil pump EOP, for controlling an output (delivery amount) of the electric oil pump EOP, to regulate the pressure $P_{MG1}$ of the working oil supplied to the above-describe first motor/generator MG1. The electronic control device 50 is further configured to apply various other command signals to various devices such as the first motor/generator MG1 and second motor/generator MG2.

Figure 5:
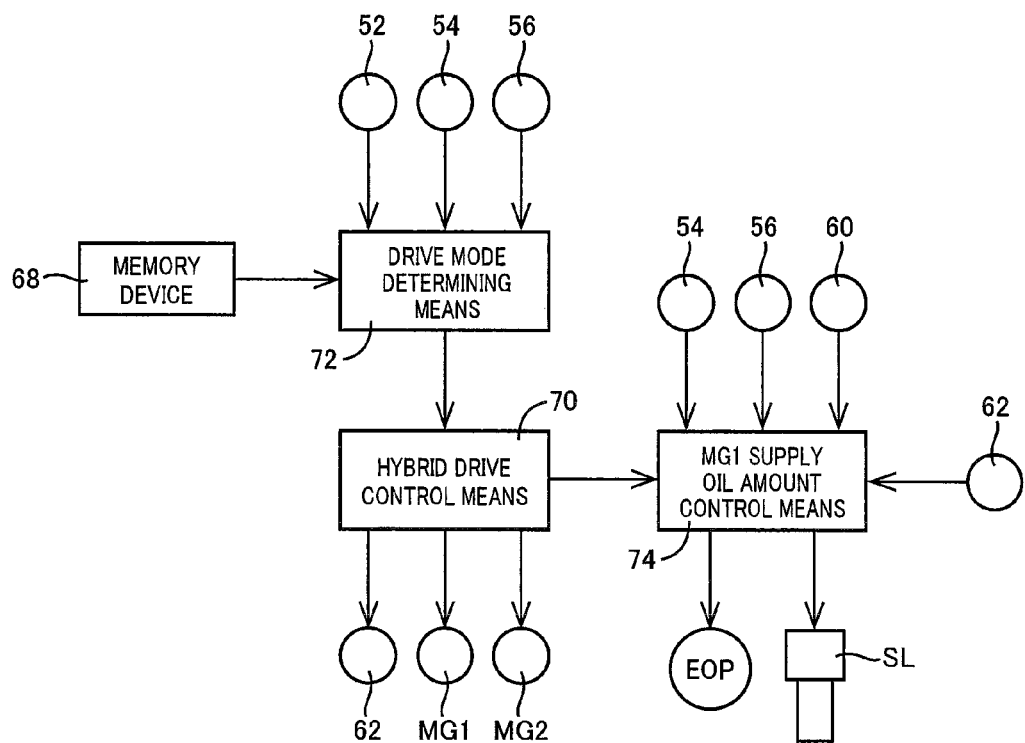
FIG. 5 is a functional block diagram for explaining major control functions of the electronic control device of FIG. 4.

FIG. 5 is the functional block diagram for explaining major control functions of the above-described electronic control device 50. Hybrid drive control means 70 shown in FIG. 5 is basically configured to select one of a plurality of drive modes indicated in FIG. 6, for placing the above-described vehicular hybrid drive system 10 in the selected drive mode. Described more specifically, the hybrid drive control means 70 commands the above-described engine output control device 66 to control the above-described engine 12, and commands the above-described first motor/generator MG1 and second motor/generator MG2 to be place in a vehicle driving state or an electricity generating state (regenerative state). In an "EV" drive state indicated in FIG. 6, the above-described starting clutch 26 is placed in its power cut-off state to disconnect the above-described engine 12 from the power transmitting path, and the above-described second motor/generator MG2 is controlled to be placed in the vehicle driving state to run the hybrid vehicle 10 in the forward or reverse direction. In this "EV" drive state, the above-described engine 12 is placed in its rest state (non-operated state). In a "series HEV" drive state, the above-described starting clutch 26 is placed in the power cut-off state to disconnect the above-described engine 12 from the power transmitting path, and the engine 12 is operated to place the first motor/generator MG1 in the electricity generating state (regenerative state), while the above-described second motor/generator MG2 is controlled to be placed in the vehicle driving state to run the hybrid vehicle 10 in the forward or reverse direction, as in the "EV" drive state. The electric power (electric energy) generated by the above-described first motor/generator MG1 in the "series HEV" drive state is supplied to the above-described second motor/generator MG2 or used to charge the above-described electric-energy storage device 60. It is noted that the motor/generator placed in the vehicle driving state means the motor/generator operating as the electric motor, while the motor/generator placed in the electricity generating state means the motor/generator operating as the electric generator.

In a "parallel HEV" drive mode indicated in FIG. 6, the above-described starting clutch 26 is placed in its power transmitting state to connect the above-described engine 12 to the power transmitting path, so that the hybrid vehicle can be run with the engine 12, first motor/generator MG1 and second motor/generator MG2 being selectively used as the drive power source or sources. The "parallel HEV" drive mode consists of four sub-modes. In a first sub-mode "a" (parallel HEV drive sub-mode in a narrow sense), the above-described engine 12 is operated, and the above-described first motor/generator MG1 is controlled to be placed in the vehicle driving state, so that the hybrid vehicle is run with the engine 12 and first motor/generator MG1 being used as the drive power sources, while the above-describe second motor/generator MG2 is controlled to be placed in a free state, without generation of an output torque. The second motor/generator MG2 rather than the first motor/generator MG1 may be controlled to be placed in the vehicle driving state. In a second sub-mode "b" (series parallel HEV drive sub-mode), the above-described engine 12 is operated, and the above-described second motor/generator MG2 is controlled to be placed in the vehicle driving state, so that the hybrid vehicle is run with the engine 12 and second motor/generator MG2 being used as the drive power sources, while the above-described first motor/generator MG1 is controlled to be placed in the electricity generating state. The electric power generated by the first motor/generator MG1 is supplied to the above-described second motor/generator MG2, or stored in the electric-energy storage device 60. In a third sub-mode "c" (engine drive sub-mode), the hybrid vehicle is run is run with only the above-described engine 12 being operated as the drive power source. In this sub-mode "c", the above-described first motor/generator MG1 and second motor/generator MG2 are controlled to be placed in the free state, without generation of an output torque. In a fourth sub-mode "d" (parallel HEV drive sub-mode in the narrow sense, like the first sub-mode "a"), the above-described engine 12 is operated, and the above-described first motor/generator MG1 and second motor/generator MG2 are controlled to be placed in the vehicle driving state, so that the hybrid vehicle is run with the engine 12, first motor/generator MG1 and second motor/generator MG2 being used as the drive power sources.

In the above-indicated sub-modes "a" and "d" (parallel HEV drive sub-mode in the narrow sense), a large vehicle drive force can be generated than in the sub-mode "c" (engine drive sub-state). The drive state is rapidly switched from the sub-mode "c" to the sub-mode "a" or "d" by controlling at least one of the above-described first motor/generator MG1 and second motor/generator MG2 to be placed in the vehicle driving state to generate an assisting torque, when the accelerator pedal operation amount θacc is abruptly increased to accelerate the vehicle or raise the running speed of the vehicle. The sub-mode "b" (series parallel HEV drive sub-mode) is similar to the sub-modes "a" and "d". However, the sub-mode "a" or "d" is established when the electric energy amount SOC stored in the above-described electric-energy storage device 60 is relatively large, while the sub-mode "b" is established when the electric energy amount SOC is relatively small. In the sub-modes of the "parallel HEV" drive mode, the forward-reverse switching device 22 is placed in the forward drive state or the reverse driving state, depending upon a selected position of a shift lever not shown.

The plurality of drive states indicated in FIG. 6 further includes a "decelerating run" drive mode which is established when the accelerator pedal operation amount θacc is substantially zeroed to decelerate the vehicle. In this "decelerating run" drive mode, the above-described starting clutch 26 is placed in the power cut-off state to disconnect the above-described engine 12 from the power transmitting path, and the above-described second motor/generator MG2 is controlled to be placed in the electricity generating state, so that the vehicle is braked by a regenerative braking force generated by the second motor/generator MG2, and the above-described electric-energy storage device 60 is charged with the electric energy generated by the second motor/generator MG2. The plurality of drive states may further includes another drive state such as a drive state in which the vehicle is run with the engine (in the sub-mode "c") while the above-described first motor/generator MG1 is controlled to be placed in the electricity generating state to charge the above-described electric-energy storage device 60.

In the present embodiment described above, the "series HEV" drive mode indicated in FIG. 6 corresponds to a first drive mode in which the above-described first moor/generator MG1 is operated with a drive force of the above-described engine 12, to generate an electric energy and in which a vehicle drive force is generated primarily by the above-described second motor/generator MG2, and a second drive mode in which the vehicle drive force is generated by the above-described engine 12 and in which at least one of the above-described first motor/generator MG1 and second motor/generator MG2 is operated to generate an assisting vehicle drive force, as needed. In the "series HEV" drive mode corresponding to the first drive mode described above, the electric energy generated by the above-described first motor/generator MG1 is supplied directly to the above-described second motor/generator MG2 through an inverter. However, the electric energy generated by the first motor/generator MG1 may be once stored in the above-described electric-energy storage device 60, and then supplied from the electric-energy storage device 60 to the above-described second motor/generator MG2.

Drive mode determining means 72 shown in FIG. 5 is configured to determine one of the above-described plurality of drive modes which should be established, on the basis of the vehicle running speed V and a value relating to the required vehicle drive force, such as the operation amount θacc or angle of opening $\theta_{TH}$ of the accelerator pedal, and according to a predetermined relationship. Namely, the drive mode determining means 72 determines one of the drive modes consisting of the "EV" drive mode, "series HEV" drive mode, "parallel HEV" drive mode, and "decelerating run" drive mode, which one drive mode should be established. FIG. 7 is the view showing one example of the relationship used by the drive mode determining means 72 to determine one of the drive modes. One of the drive modes described above by reference to FIG. 6 is selected according to a predetermined two-dimensional drive mode switching map using two parameters in the form of the vehicle running speed V, and the value relating to the required vehicle drive force, such as the operation amount θacc or angle of opening $\theta_{TH}$ of the accelerator pedal, as indicated in FIG. 7. This drive mode switching map is stored in a memory device 68, for example. The drive mode switching map has an ES switching line defining an EV region in which the "EV" drive mode should be established, and a series HEV region in which the "series HEV" drive mode should be established, and an SP switching line defining the series HEV region, and a parallel HEV region in which the "parallel HEV" drive mode should be established. The EV region lies on one side of the ES switching line on which the required vehicle drive force and the vehicle running speed are respectively smaller and lower, and the series HEV region lies between the ES switching line and the SP switching line, while the parallel HEV region lies on one side of the SP switching line on which the required drive force and the vehicle running speed are respectively larger and higher. These switching lines are provided with hysteresis to prevent frequent switching of the drive state due to a small amount of change of the vehicle running speed or required vehicle drive force. It is noted that one of the drive modes of the vehicular hybrid drive system 10 is selected on the basis of conditions other than the relationship indicated in FIG. 7. When the electric energy amount SOC detected by the above-described SOC sensor 58 is not larger than a predetermined lower limit, for instance, the "EV" drive mode is not selected, and the "series HEV" drive mode is selected to perform the electricity generating operation, or an engine drive mode is selected to operate the above-described engine 12 so that the vehicle drive force is generated primarily by the engine 12.

The above-described drive mode determining means 72 is preferably configured to change the above-indicated drive mode switching map on the basis of the temperature of the above-described first motor/generator MG1 detected by the above-described MG1 temperature sensor 56. Described more specifically, the drive mode determining means 72 changes the above-indicated drive mode switching map so as to enlarge the region for establishing the above-indicated second drive mode in the form of the "parallel HEV" drive mode, with an increase of the temperature of the above-described first motor/generator MG1. For instance, the drive mode determining means 72 determines whether the temperature $T_{MG1}$ of the above-described first motor/generator MG1 detected by the above-described MG1 temperature sensor 56 is equal to or higher than a predetermined threshold value $T_A$, and selects the low-temperature SP switching line represented by a solid line indicated in FIG. 7, if this determination is negative, that is, if the temperature $T_{MG1}$ of the above-described first motor/generator MG1 is comparatively low ($T_{MG1}<T_A$). In this case, the series HEV region in which the "series HEV" drive mode should be established is defined by the low-temperature SP switching line and the ES switching line. If the above-indicated determination is affirmative, that is, if the temperature $T_{MG1}$ of the above-described first motor/generator MG1 is comparatively high ($T_{MG1} \geq T_A$), on the other hand, the drive mode determining means 72 selects the high-temperature SP switching line represented by a broken line indicated in FIG. 7. In this case, the series HEV region in which the "series HEV" drive mode should be established is defined by the high-temperature SP switching line and the ES switching line. Thus, the drive mode determining means 72 changes the drive mode switching map. Preferably, the drive mode switching map is changed to enlarge the region for establishing the "parallel HEV" drive mode, with respect to the value relating to the required vehicle drive force in the form of the accelerator pedal operation amount θacc used as one of the switching parameters, than with respect to the vehicle running speed V used as the other switching parameter, as is apparent from FIG. 7. Namely, the parallel HEV region is enlarged by a larger amount in the direction of the switching parameter of the accelerator pedal operation amount θacc, than in the direction of the switching parameter of the vehicle running speed V. The vehicle drivability which changes with a change of the value relating to the required vehicle drive force is deteriorated to a larger extent by reduction of the functional performance of the first motor/generator MG1 due to a rise of its temperature, so that the region for establishing the "parallel HEV" drive mode is enlarged by a larger amount in the direction of the value relating to the required vehicle drive force than in the direction of the vehicle running speed V, in order to effectively prevent the above-indicated deterioration of the vehicle drivability. The above-described drive mode switching map may be changed so as to enlarge the region (the surface area of the region) for establishing the "parallel HEV" drive region, linearly in proportion to the temperature $T_{MG1}$ of the above-described first motor/generator MG1.

MG1 supply oil amount control means 74 shown in FIG. 5 is configured to control an amount of the working oil to be supplied to the above-described first motor/generator MG1 for cooling the first motor/generator MG1. Preferably, the MG1 supply oil amount control means 74 controls the delivery amount (output pressure) of the above-described electric oil pump EOP, for controlling the amount of the working oil to be supplied to the first motor/generator MG1. Preferably, the MG1 supply oil amount control means 74 controls the electromagnetic control valve in the form of the linear solenoid valve SL provided in the above-described hydraulic circuit 64, for controlling the amount of the working oil to be supplied to the first motor/generator MG1. The above-indicated MG1 supply oil amount control means 74 is configured to control the amount of the working oil to be supplied to the above-described first motor/generator MG1 for cooling the first motor/generator MG1, such that the amount is larger when the first drive mode in the form of the "series HEV" drive mode is established, than when the second drive mode in the form of the "parallel HEV" drive mode is established. This control of the amount of the working oil will be described more specifically.

FIG. 8 is the view for explaining detected values of various sensors, operating states of various devices, and the control of the amount of the working oil to be supplied from the above-described electric oil pump EOP to the above-described first motor/generator, in each of the above-indicated first drive mode in the form of the "series HEV" drive mode and the above-indicated second drive mode in the form of the "parallel HEV" drive mode. As indicated in FIG. 8, the above-described first motor/generator MG1 is kept operated to generate an electric energy (to perform a regenerative operation) in the first drive mode in the form of the "series HEV" drive mode, and is operated to generate an assisting vehicle drive force (to perform a vehicle driving operation), as needed, in the second drive mode in the form of the "parallel HEV" drive mode. Accordingly, the amount of heat generated by the above-described first motor/generator MG1 is larger in the "series HEV" drive mode, than in the "parallel HEV" drive mode, as indicated in FIG. 8.

The above-described MG1 supply oil amount control means 74 is preferably configured to turn on and off the above-described electric oil pump EOP, depending upon whether the temperature $T_{MG1}$ of the above-described first motor/generator MG1 detected by the above-described MG1 temperature sensor 56 is equal to or higher than a predetermined threshold value. In this control to turn on and off the electric oil pump EOP, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 determines the threshold values of the temperature $T_{MG1}$ of the above-described first motor/generator MG1 at or above which the above-described electric oil pump EOP is turned on, such that the threshold value is lower in the "series HEV" drive mode, than in the "parallel HEV" drive mode, as indicated in FIG. 8. On the other hand, the MG1 supply oil amount control means 74 determines the threshold values of the temperature $T_{MG1}$ of the above-described first motor/generator MG1 below which the above-described electric oil pump EOP is turned off, such that the threshold value is higher in the "series HEV" drive mode, than in the "parallel HEV" drive mode. Thus, the above-described electric oil pump EOP is turned on at a lower value of the temperature of the above-described first motor/generator MG1 in the "series HEV" drive mode than in the "parallel HEV" drive mode, and is kept on until the temperature is raised to a higher value in the "series HEV" drive mode than in the "parallel HEV" drive mode, so that the amount of the working oil to be supplied to the above-described first motor/generator MG1 is controlled to be larger in the "series HEV" drive mode than in the "parallel HEV" drive mode.

The MG1 supply oil amount control means 74 is also preferably configured to turn on and off the above-described electric oil pump EOP, depending upon whether the vehicle running speed V detected by the above-described vehicle speed sensor 54 is equal to or higher than a predetermined threshold value. In this control to turn on and off the electric oil pump EOP, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 determines the threshold values of the vehicle running speed V at or above which the above-described electric oil pump EOP is turned on, such that the threshold value is lower in the "series HEV" drive mode, than in the "parallel HEV" drive mode, as indicated in FIG. 8. On the other hand, the MG1 supply oil amount control means 74 determines the threshold values of the vehicle running speed V below which the above-described electric oil pump EOP is turned off, such that the threshold value is higher in the "series HEV" drive mode, than in the "parallel HEV" drive mode. Thus, the above-described electric oil pump EOP is turned on at a lower value of the vehicle running speed V in the "series HEV" drive mode than in the "parallel HEV" drive mode, and is kept on until the vehicle running speed V is raised to a higher value in the "series HEV" drive mode than in the "parallel HEV" drive mode, so that the amount of the working oil to be supplied to the above-described first motor/generator MG1 is controlled to be larger in the "series HEV" drive mode than in the "parallel HEV" drive mode. In this connection, it is noted that where the working oil is cooled by an air-blow type oil cooler, for example, the delivery amount of the above-described oil pump EOP may be controlled to be comparatively small at a comparatively high value of the vehicle running speed V at which the air-blow type oil cooler has a comparatively high degree of oil cooling function.

The MG1 supply oil amount control means 74 is further preferably configured to turn on and off the above-described electric oil pump EOP, depending upon whether the engine speed $N_E$ detected by the above-described engine speed sensor 60 is equal to or higher than a predetermined threshold value. In this control to turn on and off the electric oil pump EOP, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 determines the threshold values of the engine speed $N_E$ at or above which the above-described electric oil pump EOP is turned on, such that the threshold value is lower in the "series HEV" drive mode, than in the "parallel HEV" drive mode, as indicated in FIG. 8. On the other hand, the MG1 supply oil amount control means 74 determines the threshold values of the engine speed $N_E$ below which the above-described electric oil pump EOP is turned off, such that the threshold value is higher in the "series HEV" drive mode, than in the "parallel HEV" drive mode. Thus, the above-described electric oil pump EOP is turned on at a lower value of the engine speed $N_E$ in the "series HEV" drive mode than in the "parallel HEV" drive mode, and is kept on until the engine speed $N_E$ is raised to a higher value in the "series HEV" drive mode than in the "parallel HEV" drive mode, so that the amount of the working oil to be supplied to the above-described first motor/generator MG1 is controlled to be larger in the "parallel HEV" drive mode than in the "series HEV" drive mode. Where the mechanical oil pump MOP operated by the above-described engine 12 is used in addition to the above-described electric oil pump EOP, the delivery amount of the mechanical oil pump MOP is proportional to the engine speed $N_E$, so that the above-described first motor/generator MG1 can be efficiently cooled by maximizing the amount of the working oil to be supplied as a cooling fluid from the mechanical oil pump MOP in the "parallel HEV" drive mode, and by operating the above-described electric oil pump EOP so as to assist the mechanical oil pump MOP in the "series HEV" drive mode.

The above-described MG1 supply oil amount control means 74 is also preferably configured to turn off the above-described electric oil pump EOP, depending upon whether the temperature $T_{EOP}$ of the above-described electric oil pump EOP detected by the above-described EOP temperature sensor 62 is equal to or higher than a predetermined threshold value. In this control to turn off the electric oil pump EOP, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 determines the threshold value of the temperature $T_{EOP}$ of the above-described electric oil pump EOP at or above which the above-described electric oil pump EOP is turned off, such that the threshold value is higher in the "series HEV" drive mode, than in the "parallel HEV" drive mode, as indicated in FIG. 8. Thus, the above-described electric oil pump EOP is kept on until the temperature $T_{EOP}$ of the above-described electric oil pump EOP is raised to a higher value in the "series HEV" drive mode than in the "parallel HEV" drive mode, so that the amount of the working oil to be supplied to the above-described first motor/generator MG1 is controlled to be larger in the "series HEV" drive mode than in the "parallel HEV" drive mode.

The above-described MG1 supply oil amount control means 74 is further preferably configured to turn off the above-described electric oil pump EOP, depending upon whether a continuous operating time $t_{EOP}$ of the above-described electric oil pump EOP is equal to or longer than a predetermined threshold value. In this control to turn off the electric oil pump EOP, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 determines the threshold value of the continuously operating time $t_{EOP}$ of the above-described electric oil pump EOP at or above which the above-described electric oil pump EOP is turned off, such that the threshold value is longer in the "series HEV" drive mode, than in the "parallel HEV" drive mode, as indicated in FIG. 8. Thus, the above-described electric oil pump EOP is kept continuously operated for a longer length of time in the "series HEV" drive mode than in the "parallel HEV" drive mode, so that the amount of the working oil to be supplied to the above-described first motor/generator MG1 is controlled to be larger in the "series HEV" drive mode than in the "parallel HEV" drive mode.

The above-described MG1 supply oil amount control means 74 is also preferably configured to control the delivery amount Q of the above-described electric oil pump EOP. In this control, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 controls the delivery amount Q of the electric oil pump EOP to be a comparatively large value $Q_{S\,in}$ the "series HEV" drive mode, and to be a comparatively small value $Q_P$ in the "parallel HEV" drive mode, as indicated in FIG. 8. Thus, the amount of the working oil to be supplied to the above-described first motor/generator MG1 is controlled to be larger in the "series HEV" drive mode than in the "parallel HEV" drive mode.

While the manner of control of the amount of the working oil to be supplied from the above-described electric oil pump EOP to the above-described first motor/generator MG1 has been described by reference to FIG. 8, the pressure of the working oil delivered from the above-described mechanical oil pump MOP may be regulated by the above-described hydraulic circuit 64 to control the amount of the working oil to be supplied to the above-described first motor/generator MG1, in the same manner as described above such that the amount of the working oil to be supplied to the above-described first motor/generator MG1 is larger in the first drive mode in the form of the "series HEV" drive mode, than in the second mode in the form of the "parallel HEV" drive mode. For example, the above-described MG1 supply oil amount control means 74 is preferably configured to control the amount q of the working oil to be supplied to the above-described first motor/generator MG1 from the above-described hydraulic circuit 64 through the above-described linear solenoid valve SL. In this control, the MG1 supply oil amount control means 74 controls the amount of the working oil to be supplied to the above-described first motor/generator MG1 such that the amount is larger in the "series HEV" drive mode than in the second drive mode in the form of the "parallel HEV" drive mode. For example, the MG1 supply oil amount control means 74 controls the amount q of the working oil to be supplied to the above-described first motor/generator MG1, to be a comparatively large value $q_S$ in the "series HEV" drive mode, and to be a comparatively small value $q_P$ in the "parallel HEV" drive mode. Thus, the amount of the working oil to be supplied to the above-described first motor/generator MG1 is controlled to be larger in the "series HEV" drive mode than in the "parallel HEV" drive mode.

The above-described hybrid drive control means 70 is further configured to control the above-described first motor/generator MG1 and second motor/generator MG2 such that the above-described second motor/generator MG2 is assigned to generate an output torque larger than that of the above-described first motor/generator MG1, when the above-described first motor/generator MG1 and second motor/generator MG2 are operated to generate an assisting vehicle drive force in the "parallel HEV" drive mode, that is, in the sub-mode "d". In other words, the hybrid drive control means 70 controls the operations of the above-described first motor/generator MG1 and second motor/generator MG2 such that the second motor/generator MG2 generates a larger assisting vehicle drive force than the first motor/generator MG1. The above-described second motor/generator MG2 is operated also in the "EV" drive mode and "series HEV" drive mode to generate a vehicle drive force, and is relatively frequently used as the vehicle drive power source in the above-described vehicular hybrid drive system 10, together with the above-described engine 12, so that the second motor/generator MG2 can be supplied with an amount of the working oil which is large enough to permit sufficient cooling of the second motor/generator MG2. For this reason, the above-described second motor/generator MG2 is assigned to generate the larger assisting vehicle drive force in the "parallel HEV" drive mode, for thereby reducing a load acting on the above-described first motor/generator MG1, and advantageously eliminating a need of excessively increasing the amount of the working oil used to cool the first motor/generator MG1.

Figure 9:
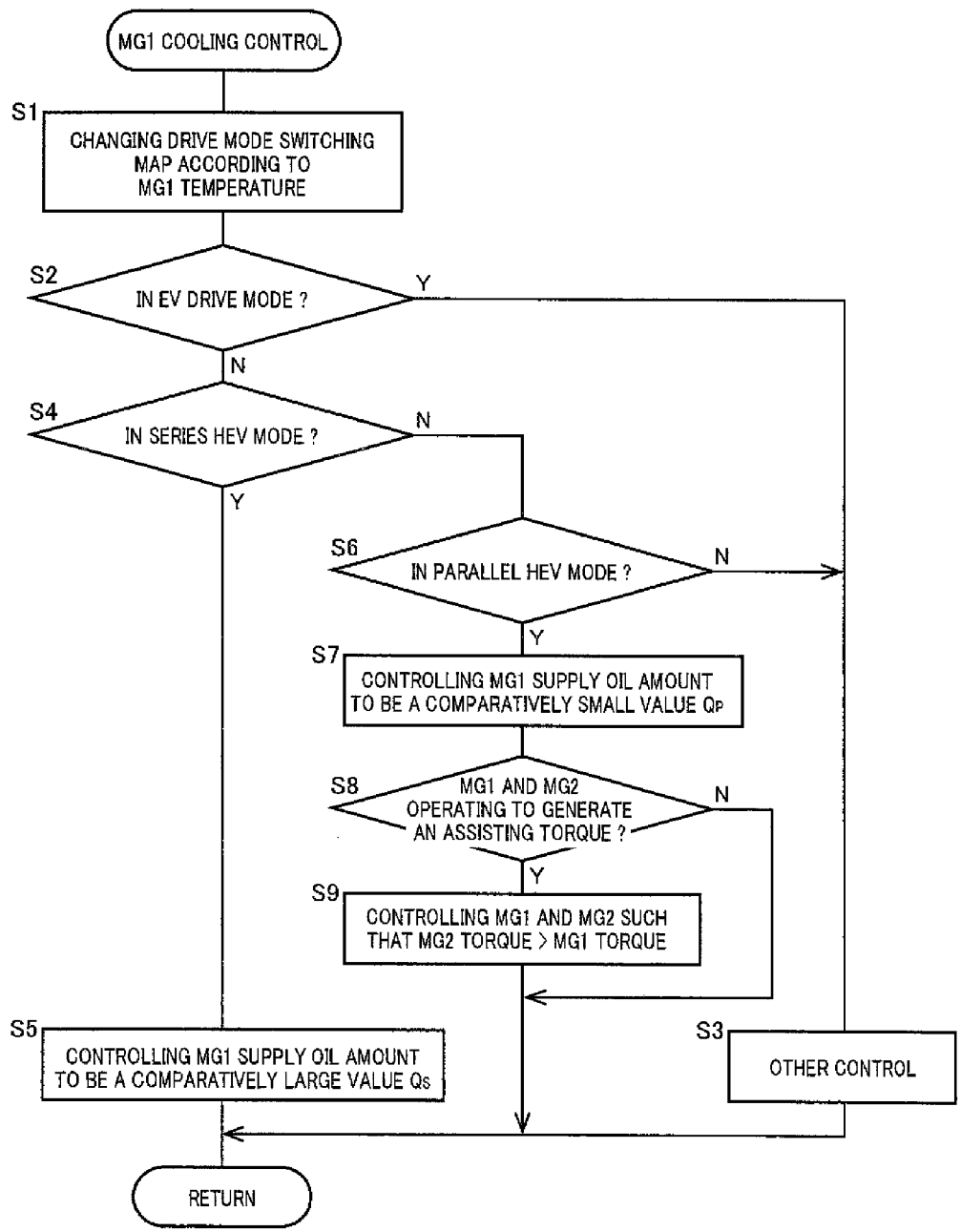
FIG. 9 is a flow chart for explaining major portions of a cooling control for the first motor/generator, which is executed by the electronic control device of FIG. 4.

FIG. 9 is the flow chart for explaining major portions of a cooling control for the above-described first motor/generator MG1, which is repeatedly executed by the above-described electronic control device 50, with a predetermined cycle time.

Initially, step S1 (hereinafter "step" being omitted) is implemented to change the drive mode switching map on the basis of the temperature $T_{MG1}$ of the above-described first motor/generator MG1 detected by the above-described MG1 temperature sensor 56. Namely, the drive mode switching map is changed so as to enlarge the region for establishing the second drive mode in the form of the "parallel HEV" drive mode, with an increase of the temperature $T_{MG1}$ detected by the above-described MG1 temperature sensor 56. Then, the control flow goes to S2 to make a determination according to the drive mode switching map set in S1, as to whether a running condition of the vehicle represented by the vehicle running speed V and the accelerator pedal operation amount θacc lies in the region for establishing the "EV" drive mode. If an affirmative determination is obtained in S2, the control flow goes to S3 to implement other controls such as a control to cool the above-described first motor/generator MG1 in the "EV" drive mode, and one cycle of execution of the present routine is terminated.

If a negative determination is obtained in S2, the control flow goes to S4 to determine whether the running condition of the vehicle represented by the vehicle running speed V and the accelerator pedal operation amount θacc lies in the region for establishing the "parallel HEV" drive mode. If a negative determination is obtained in S4, the control flow goes to S6 and the following steps. If an affirmative determination is obtained in S4, the control flow goes to S5 control the amount of the working oil to be supplied from the above-described electric oil pump EOP to the above-described first motor/generator MG1, to be the comparatively large value $Q_S$, and one cycle of execution of the present routine is terminated. S6 is implemented to determine whether the running condition of the vehicle represented by the vehicle running speed V and the accelerator pedal operation amount θacc lies in the region for establishing the "parallel HEV" drive mode. If a negative determination is obtained in S6, the control flow goes to S3. If an affirmative determination is obtained in S6, the control flow goes to S7 and the following steps.

S7 is implemented to control the amount of the working oil to be supplied from the above-described electric oil pump EOP to the above-described first motor/generator MG1, to be the comparatively small value $Q_P$. Then, the control flow goes to S8 to determine whether the hybrid drive system is placed in the sub-mode "d" of the "parallel HEV" drive mode, in which both of the above-described first motor/generator MG1 and second motor/generator MG2 are operated to generate an assisting vehicle drive force. If a negative determination is obtained in S8, one cycle of execution of the present routine is terminated. If an affirmative determination is obtained in S8, the control flow goes to S9 to control the operations of the above-described first motor/generator MG1 and second motor/generator MG2 such that the output torque of the second motor/generator MG2 is larger than that of the first motor/generator MG1, and one cycle of execution of the present routine is terminated. In the cool control described above, S2, S4 and S6 corresponds to an operation of the above-described drive mode determining means 72, while S5 and S7 correspond to an operation of the above-described. MG1 supply oil amount control means 74.

The present embodiment is configured to control the amount of the working oil to be supplied to the above-described first motor/generator MG1 for cooling the first motor/generator MG1 such that the amount is larger in the first drive mode in the form of the "series HEV" drive mode than in the second drive mode in the form of the "parallel HEV" drive mode, so that the above-described first motor/generator MG1 is sufficiently cooled in the above-described first drive mode in which the need for cooling the first motor/generator MG1 is relatively high, while the amount of the working oil to be supplied to the first motor/generator MG1 is restricted in the above-described second drive mode, whereby the fuel economy of the vehicle can be improved, and a dragging power loss due to an excessive amount of supply of the working oil can be reduced. Namely, the present embodiment provides the vehicular hybrid drive system 10 which permits sufficient cooling of an electric motor depending upon a selected one of the vehicle drive modes.

Further, the vehicular drive system according to the present embodiment is provided with the temperature sensor 56 for detecting the temperature $T_{MG1}$ of the above-described first motor/generator MG1, and is configured to determine one of the regions for establishing a corresponding one of the above-described first and second drive modes, on the basis of the vehicle running speed V and the operation amount θacc of accelerator pedal as the value relating to the required vehicle drive force, and according to the predetermined relationship which is changed so as to enlarge the region for establishing the above-described second drive mode, with an increase of the temperature $T_{MG1}$ of the above-described first motor/generator MG1 detected by the above-described MG1 temperature sensor 56. Accordingly, the region for establishing the above-described second drive mode in which the need for cooling the above-described first motor/generator MG1 is relatively low is enlarged with an increase of the need for cooling the first motor/generator MG1 as a result of a rise of its temperature $T_{MG1}$, so that the amount of the working oil to be supplied to the above-described first motor/generator MG1 can be restricted, and the fuel economy can be further improved.

The present embodiment is also configured such that the above-described drive mode switching map is changed to enlarge the region for establishing the above-described second drive mode, with an increase of the temperature $T_{MG1}$ of the above-described first motor/generator MG1 detected by the above-described MG1 temperature sensor 56, making it possible to reduce a rise of the temperature of the working oil, and effectively prevent deterioration of the working oil. It is noted that the deterioration (reduction of volume resistivity) of the working oil gives rise to a risk of reduction of the degree of electrical insulation of a coil of the electric motor, and that the prevention of the deterioration of the working oil assures a sufficiently high degree of electrical insulation of the coil of the electric motor, providing a secondary advantage of reduction of the required cost for the insulating material.

Further, the vehicular hybrid drive system according to the present embodiment is provided with the electric oil pump EOP for supplying the working oil to the above-described first motor/generator MG1, and is configured to control the delivery amount Q of the electric oil pump EOP, for thereby controlling the amount of the working oil to be supplied to the above-described first motor/generator MG1. Accordingly, the amount of the working oil to be supplied to the above-described first motor/generator MG1 for cooling the first motor/generator MG1 can be controlled in a practically advantageous manner.

Further, the vehicular hybrid drive system according to the present embodiment is provided with the hydraulic circuit 64 for controlling the amount of the working oil to be supplied to the above-described first motor/generator MG1, and is configured to control the electromagnetic control valve in the form of the linear solenoid valve SL provided in the hydraulic circuit 64, for thereby controlling the amount of the working oil to be supplied to the above-described first electric motor. Accordingly, the amount of the working oil to be supplied to the above-described first motor/generator MG1 for cooling the first motor/generator MG1 can be controlled in a practically advantageous manner.

The present embodiment is also configured such that the output torque of the above-described second motor/generator MG2 is larger than that of the above-described first motor/generator MG1 when the above-described first motor/generator and second motor/generator MG2 are operated to generate the assisting vehicle drive force in the above-described second drive mode. Accordingly, the above-described second motor/generator MG2 which is designed to be sufficiently cooled is assigned to generate the larger assisting vehicle drive force, for thereby reducing the amount of the working oil to be supplied to the above-described first motor/generator MG1, and further improving the fuel economy.

Other preferred embodiments of this invention will be described in detail by reference to the drawings. In the following description, the same reference signs will be used to identify the same elements in the different embodiments, which will not be described.

Second Embodiment

FIG. 10 is the schematic view showing an arrangement of another vehicular hybrid drive system to which the present invention is suitably applicable. In this hybrid drive system 100 shown in FIG. 10, the above-described engine 12 is subjected to a cranking action by a starter motor 102 connected to the crankshaft 14 through a belt, for example. The hybrid drive system 100 is provided with a step-variable automatic transmission 104 of a planetary gear type, for instance, which has a plurality of speed positions and a neutral position which are selectively established by engaging and releasing actions of a plurality of clutches and brakes. Between an input shaft 106 of the automatic transmission 104 and the crankshaft 14, there is interposed a starting clutch 108 configured to selectively place a power transmitting path therebetween in a power transmitting state and a power cut-off state. The above-indicated starter motor 102 is a motor/generator which also has a function of an electric generator. The above-described first gear 25 is mounted on an output shaft 110 of the above-described automatic transmission 104, so that the vehicle drive force is transmitted from the first gear 25 to the front drive wheels 40L and 40R. The present hybrid drive system 100 is provided with a rear wheel drive device 120 wherein a rotary motion of a rear drive motor/generator RMG is transmitted through a fifth gear 122 and a sixth gear 124 to rotate a differential gear device 126, a rotary motion of which is transmitted to left and right rear drive wheels 130L and 130R through left and right axles 128L and 128R. In the hybrid drive system 100, the above-described starter motor 102 corresponds to a first electric motor, while the above-described rear drive motor/generator RMG corresponds to a second electric motor. The working oil delivered from the electric oil pump EOP not shown, or the working oil which is delivered from the mechanical oil pump MOP connected to the engine 12 and the pressure of which is regulated by the hydraulic circuit 64 is supplied to the first electric motor in the form of the above-described starter motor 102, for cooling the first electric motor.

The hybrid drive system 100 constructed as described above is also configured to selectively establish one of a first drive mode in which the first electric motor in the form of the starter motor 102 is operated with the drive force of the above-described engine 12, to generate an electric energy and in which the vehicle drive force is generated primarily by the second electric motor in the form of the rear drive motor/generator RMG, and a second drive mode in which the vehicle drive force is generated by the above-described engine 12 and in which at least one of the above-described starter motor 102 and rear drive motor/generator RMG is operated to generate an assisting vehicle drive force, as needed. Like the vehicular hybrid drive system 10 according to the preceding embodiment, the above-described vehicular hybrid drive system 100 is also provided with the above-described electronic control device 50 provided with the functional means including the hybrid drive control means 70, drive mode determining means 74 and MG1 supply oil amount control means 72. The MG1 supply oil control means 74 controls the amount of the working oil to be supplied to the above-described starter motor 102 for cooling the starter motor 102, such that the amount is larger in the above-described first drive mode than in the above-described second drive mode. Thus, like the preceding embodiment, the present embodiment shown in FIG. 10 provides the vehicular hybrid drive system 100 which permits sufficient cooling of the electric motor depending upon a selected one of the vehicle drive modes.

Third Embodiment

FIG. 11 are the views for explaining a further vehicular hybrid drive system to which the present invention is suitably applicable, FIG. 11(a) being the schematic view showing an arrangement of the hybrid drive system, while FIG. 11(b) being the view for explaining a plurality of drive modes to be selectively established in the hybrid drive system. In this hybrid drive system 150 shown in FIG. 11, the above-described engine 12, a first clutch 152, the first motor/generator MG1, a second clutch 154 and the second motor/generator MG2 are disposed in series coaxially with each other, and an output gear 156 interposed between the second clutch 154 and the second motor/generator MG2 is held in meshing engagement with the above-described fourth gear 34. Like the drive system of the vehicular hybrid drive system 10 described above with respect to the preceding embodiment, the present hybrid drive system 150 is configured to selectively establish one of the "EV" drive mode, the "series HEV" drive mode, the "parallel HEV" drive mode having the four sub-modes, and the "decelerating run" drive mode, as shown in FIG. 11(b). In the present hybrid drive system 150, the above-described first motor/generator MG1 corresponds to a first electric motor, while the above-described second motor/generator MG2 corresponds to a second motor generator. The working oil delivered from the electric oil pump EOP not shown, or the working oil which is delivered from the mechanical oil pump MOP connected to the engine 12 and the pressure of which is regulated by the hydraulic circuit 64 is supplied to the first electric motor in the form of the above-described first motor/generator MG1, for cooling the first electric motor.

The hybrid drive system 150 constructed as described above is also configured to selectively establish one of a first drive mode in the form of the "series HEV" drive mode in which the first electric motor in the form of the motor/generator MG1 is operated with a drive force of the above-described engine 12, to generate an electric energy and in which the vehicle drive force is generated primarily by the second electric motor in the form of the second motor/generator MG2, and a second drive mode in the form of the "parallel HEV" drive mode in which the vehicle drive force is generated by the above-described engine 12 and in which at least one of the first motor/generator MG1 and second motor/generator MG2 is operated to generate an assisting vehicle drive force, as needed. Like the vehicular hybrid drive system 10 according to the previously described embodiment, the above-described vehicular hybrid drive system 150 is also provided with the above-described electronic control device 50 provided with the functional means including the hybrid drive control means 70, drive mode determining means 72 and MG1 supply oil amount control means 74. The MG1 supply oil control means 74 controls the amount of the working oil to be supplied to the above-described first motor/generator MG1 for cooling the first motor/generator MG1, such that the amount is larger in the above-described first drive mode than in the above-described second drive mode. Thus, like the preceding embodiments, the present embodiment shown in FIG. 11 provides the vehicular hybrid drive system 150 which permits sufficient cooling of the electric motor depending upon a selected one of the vehicle drive modes.

Fourth Embodiment

Figure 12A:
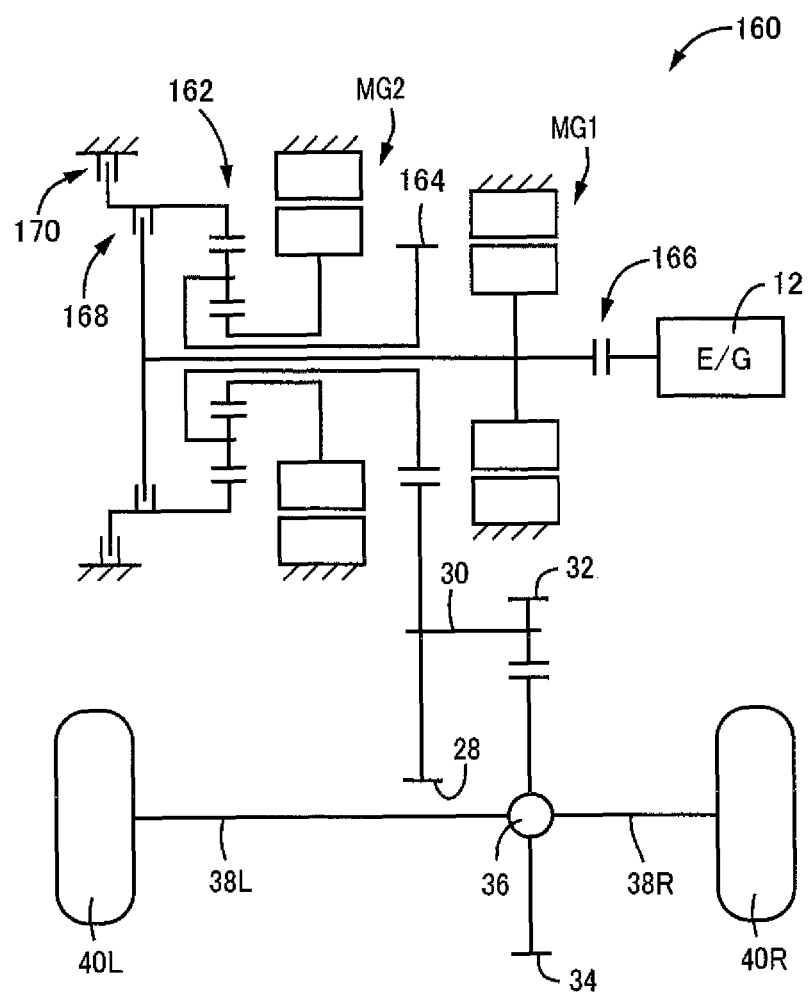
FIG. 12 are views for explaining a still further vehicular hybrid drive system to which the present invention is suitably applicable, FIG. 12(a) being a schematic view showing an arrangement of the vehicular hybrid drive system, while FIG. 12(b) being a view for explaining a plurality of drive states to be selectively established in the vehicular hybrid drive system.

FIG. 12 are the views for explaining a still further vehicular hybrid drive system to which the present invention is suitably applicable, FIG. 12(a) being the schematic view showing an arrangement of the hybrid drive system, while FIG. 12(b) being the view for explaining a plurality of drive modes to be selectively established in the hybrid drive system. In the hybrid drive system 160 shown in FIG. 12, the above-described engine 12, first motor/generator MG1 and second motor/generator MG2, and an output gear 164 are connected to a planetary gear set 162, and a first clutch 166 is interposed between the engine 12 and the first motor/generator MG1, while the first motor/generator MG1 is connected to a ring gear of the planetary gear set 162 through a second clutch 168. The ring gear of the planetary gear set 162 can be fixed to a stationary member through a brake 170. The second motor/generator MG2 is connected to a sun gear of the above-described planetary gear set 162, and an output gear 164 is connected to a carrier of the planetary gear set 162, while the output gear 164 is held in meshing engagement with the above-described second gear 28.

Like the drive system of the hybrid vehicle 10 according to the previously described embodiment, the above-described hybrid drive system 160 is configured to selectively establish one of the "EV" drive mode, the "series HEV" drive mode, the "parallel HEV" drive mode having the three sub-modes, and the "decelerating run" drive mode, as shown in FIG. 15(b). In the present hybrid drive system 160, the above-described first motor/generator MG1 corresponds to a first electric motor, while the above-described second motor/generator MG2 corresponds to a second motor generator. The working oil delivered from the electric oil pump EOP not shown, or the working oil which is delivered from the mechanical oil pump MOP connected to the engine 12 and the pressure of which is regulated by the hydraulic circuit 64 is supplied to the first electric motor in the form of the above-described first motor/generator MG1, for cooling the first electric motor.

The hybrid drive system 160 constructed as described above is also configured to selectively establish one of a first drive mode in the form of the "series HEV" drive mode in which the first electric motor in the form of the first motor/generator MG1 is operated with the drive force of the above-described engine 12, to generate an electric energy and in which the vehicle drive force is generated primarily by the second electric motor in the form of the second motor/generator MG2, and a second drive mode in the form of the "parallel HEV" drive mode in which the vehicle drive force is generated by the above-described engine 12 and in which at least one of the above-described first motor/generator MG1 and second motor/generator MG2 is operated to generate an assisting vehicle drive force, as needed. Like the vehicular hybrid drive system 10 according to the preceding embodiment, the above-described vehicular hybrid drive system 160 is also provided with the above-described electronic control device 50 provided with the functional means including the hybrid drive control means 70, drive mode determining means 72 and MG1 supply oil amount control means 74. The MG1 supply oil control means 74 controls the amount of the working oil to be supplied to the above-described first motor/generator MG1 for cooling the first motor/generator MG1, such that the amount is larger in the above-described first drive mode than in the above-described second drive mode. Thus, like the preceding embodiments, the present embodiment shown in FIG. 12 provides the vehicular hybrid drive system 160 which permits sufficient cooling of the electric motor depending upon a selected one of the vehicle drive modes.

While the preferred embodiments of this invention have been described in detail by reference to the drawings, it is to be understood that the invention is not limited to the details of the illustrated embodiments, but may be embodied with various changes, which may occur to those skilled in the art, without departing from the spirit and scope of the invention.

NOMENCLATURE OF REFERENCE SIGNS

| | |
|---|---|
| 10, 100, 150, 160: Vehicular hybrid drive system | 12: Engine |
| 14: Crankshaft | 16: Intermediate shaft |
| 18: Input shaft | 20: Automatic transmission |
| 22: Forward-reverse switching device | 24: Output shaft |
| 25: First gear | 26: Starting clutch |
| 28: Second gear | 30: Counter shaft |
| 32: Third gear | 34: Fourth gear |
| 36: Differential gear device | 38L, 38R: Axles |
| 40L, 40R: Front drive wheels | 42: Planetary gear set |
| 50: Electronic control device | 52: Accelerator pedal operation amount sensor |
| 54: Vehicle speed sensor | 56: MG1 temperature sensor |
| 58: SOC sensor | 60: Engine speed sensor |
| 62: EOP temperature sensor | 64: Hydraulic circuit |
| 66: Engine output control device | 68: Memory device |
| 70: Hybrid drive control means | 72: Drive mode determining means |
| 74: MG1 supply oil amount control means | 102: Starter motor (First electric motor) |
| 104: Automatic transmission | 106: Input shaft |
| 108: Starting clutch | 110: Output shaft |
| 120: Rear wheel drive device | 122: Fifth gear |
| 124: Sixth gear | 126: Differential gear device |
| 128L, 128R: Axles | 130L, 130R: Rear drive wheels |
| 152: First clutch | 154: Second clutch |
| 156: Output gear | 162: Planetary gear set |
| 164: Output gear | 166: First clutch |
| 168: Second clutch | 170: Brake |
| B1: Reverse drive brake | C1: Forward drive clutch |
| EOP: Electric oil pump | MOP: Mechanical oil pump |
| MG1: First motor/generator (First electric motor) | MG2: Second motor/generator (Second electric motor) |
| RMG: Rear motor/generator (Second electric motor) | SL: Linear solenoid valve (Electromagnetic control valve) |

The invention claimed is:

1. A vehicular hybrid drive system provided with an engine, a first electric motor connected to said engine, and a second electric motor connected to drive wheels of the vehicle, said hybrid drive system comprising drive mode determining means for selectively establishing one of a first drive mode in which said first electric motor is operated with a drive force of said engine, to generate an electric energy and in which a vehicle drive force is generated primarily by said second electric motor, and a second drive mode in which the vehicle drive force is generated by said engine and in which at least one of said first and second electric motors is operated to generate an assisting vehicle drive force, as needed, said hybrid drive system further comprising supply oil amount control means for controlling an amount of a working oil to be supplied to said first electric motor such that the amount is larger in said first drive mode than in said second drive mode.

2. The vehicular hybrid drive system according to claim 1, further comprising a temperature sensor for detecting a temperature of said first electric motor, and wherein said drive mode determining means determines one of regions for establishing a corresponding one of said first and second drive modes, on the basis of a running speed of the vehicle speed and a value relating to a required vehicle drive force, and according to a relationship which is predetermined so as to enlarge the region for establishing said second drive mode, with an increase of the temperature of said first electric motor detected by said temperature sensor.

3. The vehicular hybrid drive system according to claim 1, further comprising an electric oil pump for supplying the working oil to said first electric motor, and wherein said supply oil amount control means controls a delivery amount of said electric oil pump, for thereby controlling the amount of the working oil to be supplied to said first electric motor.

4. The vehicular hybrid drive system according to claim 1, further comprising a hydraulic circuit for controlling the amount of the working oil to be supplied to said first electric motor, and wherein said supply oil amount control means controls an electromagnetic control valve provided in said hydraulic circuit, for thereby controlling the amount of the working oil to be supplied to said first electric motor.

5. The vehicular hybrid drive system according to claim 1, further comprising hybrid drive control means for controlling said first and second electric motors such that an output torque of said second electric motor is larger that that of said first electric motor when said first and second electric motors are operated to generate the assisting vehicle drive force in said second drive mode.

6. The vehicular hybrid drive system according to claim 1, wherein the working oil is supplied to said first electric motor, for cooling said first electric motor.

7. The vehicular hybrid drive system according to claim 2, wherein the region for establishing said second drive mode is larger when the temperature of said first electric motor detected by said temperature sensor is equal to or higher than a predetermined threshold value, than when the temperature is lower than said threshold value.

* * * * *